June 2, 1925.

E. L. KELLAN 1,540,400

FLUSH VALVE DEVICE

Filed April 14, 1920     3 Sheets-Sheet 1

Inventor
Edward L. Kellan.
By William... Atty.

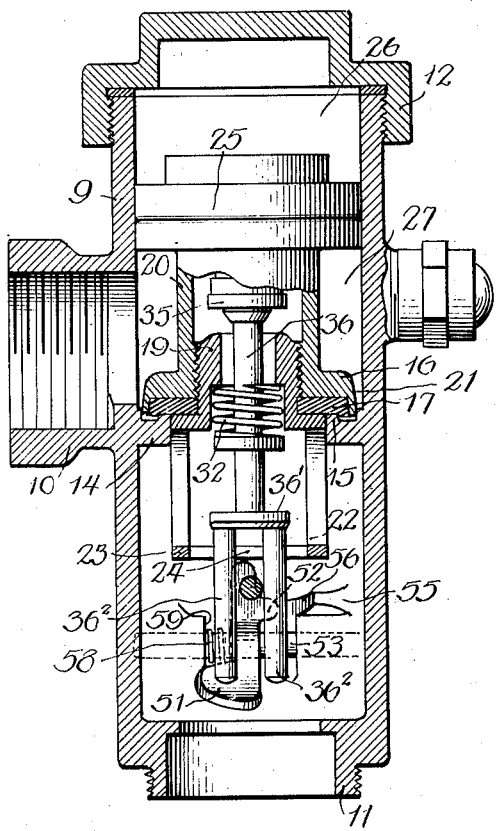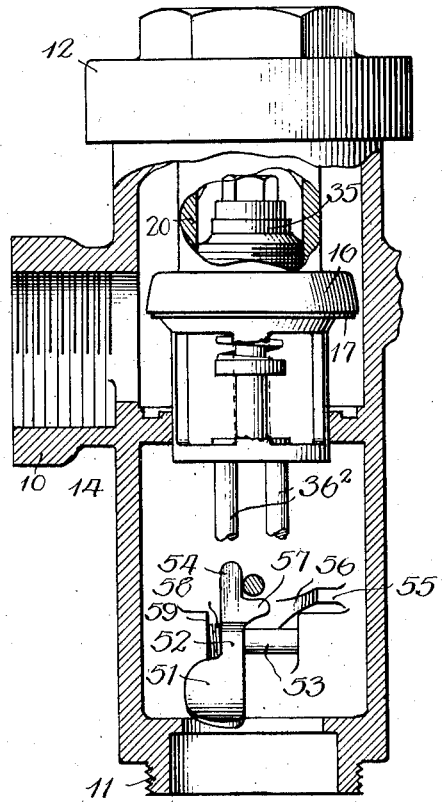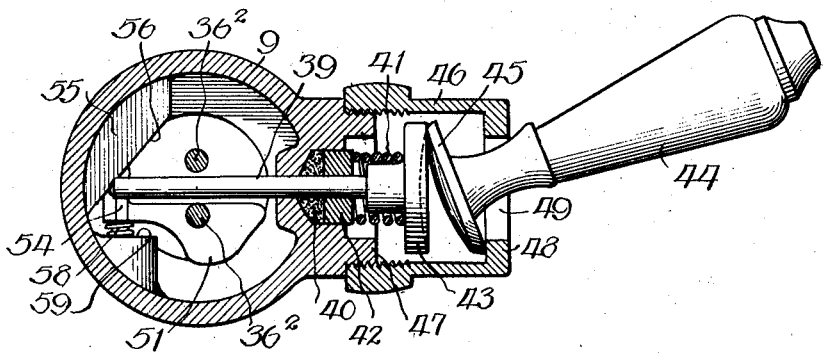

June 2, 1925.

E. L. KELLAN

FLUSH VALVE DEVICE

Filed April 14, 1920

Inventor
Edward L. Kellan
By William Hall
Atty

Patented June 2, 1925.

1,540,400

UNITED STATES PATENT OFFICE.

EDWARD L. KELLAN, OF CHICAGO, ILLINOIS.

FLUSH-VALVE DEVICE.

Application filed April 14, 1920. Serial No. 373,722.

*To all whom it may concern:*

Be it known that I, EDWARD L. KELLAN, a citizen of the United States, and a resident of Chicago, in the county of Cook and State of Illinois, have invented certain new and useful Improvements in Flush-Valve Devices; and I do hereby declare that the following is a full, clear, and exact description thereof, reference being had to the accompanying drawings, and to the characters of reference marked thereon, which form a part of this specification.

This invention relates to improvements in flush valve devices for supplying a desired volume of liquid to a place or places where the liquid is to be used through a desired interval of time from a source of liquid supply under pressure.

The present invention relates to that type of valve device commonly known as semi-automatic, wherein the valve is open for the flow of liquid therethrough by the instrumentality of a manually operable device and is closed through the action of differential pressures on the operative valve parts.

The valve device herein shown is of that type wherein a main valve is normally held on its seat by the pressure of the liquid at the inlet side of the valve, and the device embodies, in connection with the main valve, an auxiliary or starting valve which is so constructed and arranged that when open it causes the pressures on the upper and lower sides of the main valve to be unbalanced so that said main valve, after the initial opening of the auxiliary or starting valve is opened by the superior pressure beneath the same; and there is a by-pass to allow a reestablishment of normal pressures on the faces of the valve parts when said auxiliary valve is seated so that the inlet pressure automatically seats the main valve after a predetermined period of flow.

Among the objects of the invention is to provide intermediate the manual actuator and the starting or auxiliary valve, a controller device for the auxiliary valve so arranged that when the actuator is operated the auxiliary valve is positively lifted to release pressure on one side of the main valve to allow it to be opened by the inlet pressure, but which, upon complete movement of the actuator to open the auxiliary valve, will automatically arrange the parts to permit the auxiliary valve to close so that pressure from the source acting on the differential areas of the main valve, when the auxiliary valve is closed, operates automatically to close the main valve through a period of time, depending upon the size of the opening of the by-pass between the inlet and one side of the main valve, regardless of whether actuating pressure has been released from the actuator.

Another object of the invention is to so construct the auxiliary valve with respect to its control member that the auxiliary valve may be dropped into place after removal, in perfect cooperative relation to the controller element therefor.

Other objects of the invention are to improve and simplify valve devices of the general character and for the purpose set forth, and the invention consists in the combination and arrangement of the parts described in the specification and illustrated in the drawings, and is pointed out in the appended claims.

In the drawings,

Figure 3 is a vertical section on the line 3—3 of Figure 1, with parts in elevation.

Figure 4 is a section similar to Figure 3, with the parts in changed operative positions.

Figure 5 is a horizontal section, with parts in elevation, on the line 5—5 of Figure 1.

Figure 1:
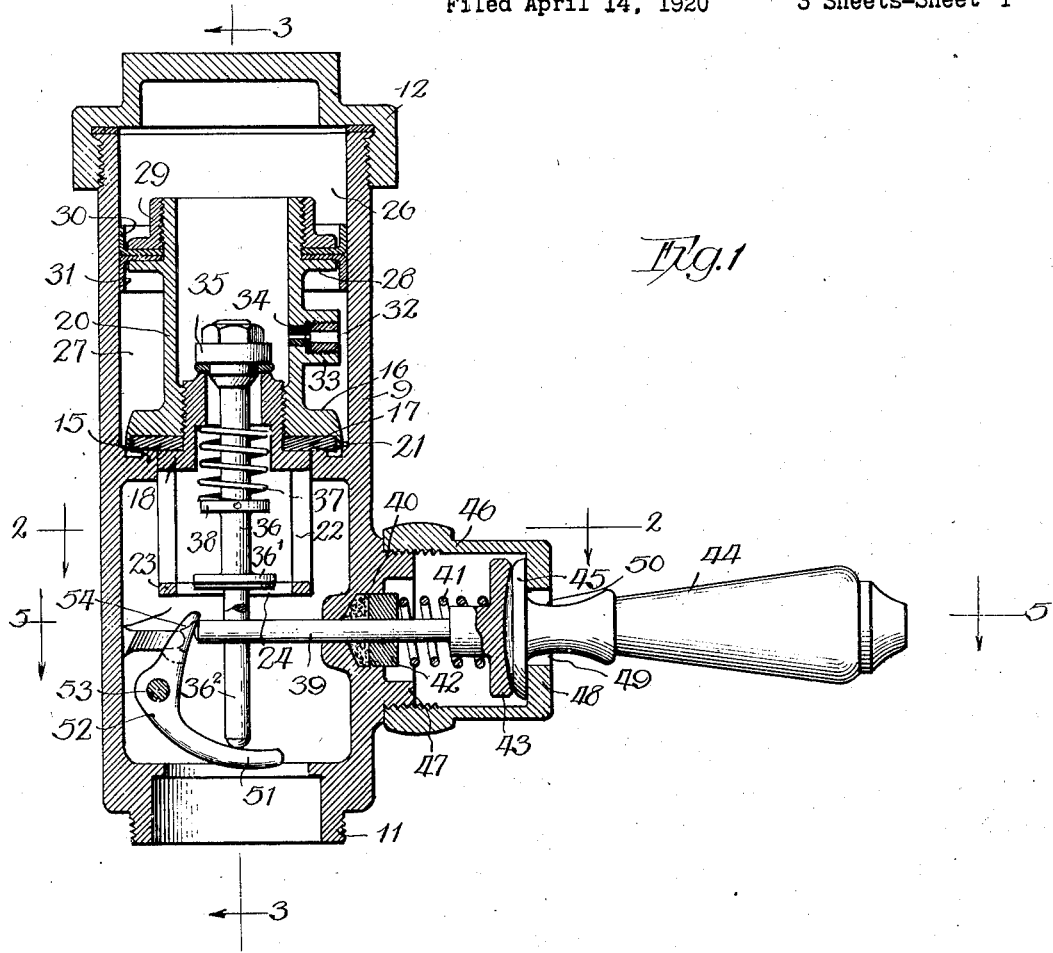
Figure 1 is an axial view, with parts in elevation, of a valve device embodying my invention.
Figure 2:
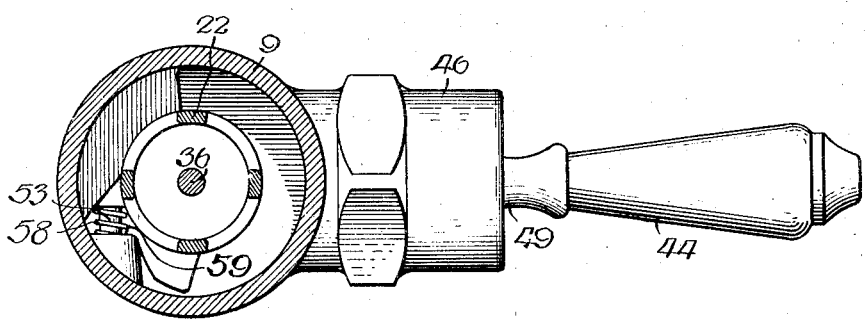
Figure 2 is a horizontal section on the line 2—2 thereof.

As shown in the drawings, the valve casing 9 is provided between its ends with an inlet branch 10 and at its lower end with an outlet branch 11. The upper end of the casing is closed by a threaded cap 12. The casing is provided near its inlet branch with an internal annular flange 14 on which is formed an upwardly facing annular body seat 15. This seat is shown as made integral with the casing, but, of course, may be otherwise adapted thereto.

16 designates as a whole the main valve which has a seating face, formed preferably on a disc 17 of some suitable yielding material that directly engages the body seat 15. The said disc is shown as confined between the lower portion of the valve body 16 and a flange 18, which latter fits within the seat, but loosely enough to provide for after fill, and is provided with an externally screw threaded hollow stem 19 that extends upwardly into a neck 20 that is carried by or made integral with the main valve, the neck being internally threaded to engage the threads of the hollow stem to thereby lock the seat disc between the flange 18 and the valve body. Preferably and as shown, the valve body is additionally formed with a depending annular lip or flange 21 that fits outside the seat disc to prevent the latter from spreading under seating pressure and acts in a reduced bore in the casing exterior to the seat to slow down the flow before the main valve is fully seated. A guide cage 22 for the main valve is formed part of or attached to the flange 18 and depends therefrom and terminates in a horizontal ring 23 that has a central opening 24 therein.

Carried by the upper end of the neck 20 is a motor piston 25 that is of larger diameter than the valve and fits closely within the shell or casing 9. Said piston divides the casing cylinder into upper and lower pressure chambers 26, 27, respectively. The said piston is formed by providing the neck 20 with an integral flange 28 and confining between said flange and the flange of a threaded ring 29 on said neck preferably a two part packing, consisting of upper and lower cup leathers 30, 31; the cup of the lower cup leather extending below the flange 28 of the neck and that of the upper cup leather above the flange of the threaded ring 29. With the construction described it will be observed that the piston is packed against the passage of liquid between the same and the wall of the casing in the movement of the piston in both directions. As constructed, the neck 20 constitutes a unitary portion of the piston to the extent that the flanges between which the cup leathers are confined are fixed relatively to the neck, but it will be understood that this construction, so far as the essence of the invention is concerned, may be somewhat varied. It will also be observed that the neck is open at its top so that it is in free communication with the upper chamber 26.

The said upper chamber 26 communicates with the inlet side of the valve through a by-pass 32 which is shown as formed in a nipple 33 that may be integral with and extends laterally from the neck 20. It is also to be noted that the nipple terminates short of the inner wall of the casing and terminates radially inside the periphery of the piston 25 and that the interior of the casing or cylinder is cylindrically smooth or unobstructed. Therefore, the unit carrying the by-pass element can be readily placed in and removed from the casing without finding a special place for the by-pass element, thereby greatly contributing to the simplicity of assembling and demounting the valve. So also is the outer end of the by-pass in free communication with the inlet at all times during the operation of the valve. Preferably, a screen extends across the by-pass, and the reduced flow determining part of the by-pass is formed in a non-corrosive material 34, as tin, lead, solder, and the like, so that clogging of the by-pass, due to corrosion, is avoided.

The hollow stem 19 is formed at its upper end to provide an annular seat which is engaged by an auxiliary valve 35 carried by the upper end of a valve stem 36 which latter extends downwardly through the stem 19, the hollow main valve and the guide cage 22, and said stem terminates in two laterally separated legs $36^2$ joined to the valve stem by a cross bar 36'. Said auxiliary valve 35 is normally maintained on its seat by the expansion of a spring 37 which surrounds the stem 36 and is interposed between an internal shoulder on the member 19 and a collar 38 on the stem.

Said auxiliary valve 35 when shifted off its seat from the position shown in Figure 1 to the position shown in Figure 4 permits the passage of liquid from the upper chamber 26 (through the hollow member 19 and neck 20) to the outlet side of the valve, thus temporarily reducing pressure above the piston 25, to cause the maintained inlet pressure to act on the under side of the piston to open the main valve, and when the relief valve 35 is again seated, the main valve will close at a rate due to the flow rate through the by-pass. The auxiliary valve is thus unseated by means made as follows:

39 designates a horizontal, axially displaceable plunger that extends through a stuffing box 40 in one wall of the valve casing below the main valve guide 22, 23, and is normally held extended axially towards the outer limit of its stroke by a spring 41 that bears at its inner end against a gland 42 of the stuffing box 40 and at its outer end against an enlarged head 43 on the plunger 39. 44 designates a hand piece or auxiliary valve actuator that is formed at its inner end with a head 45 that bears against the head 43 of the plunger 39, and these heads are formed, one (45) with a convex bearing face, and the other (43) with a concave bearing face. In order to form an abutment for the head 45 of the actuator handle or lever 44, and also to enclose portions of the mechanism, a housing 46 is threaded to a nipple 47 which extends laterally from the casing, and this housing has an outer end wall 48 that is formed with an opening 49 of a diameter to receive the restricted neck portion 50 of the actuator handle or lever 44 just exterior to its head 45.

The head 45 of said lever within the housing normally bears with its outer flat face against the inner face of the end wall 48 and with its inner convex face against the contiguous concave face of the head or flange 43 of plunger 39. In this position of the parts, the lever or handle is normal to the plane of the head 43 and the parts are so held by the spring 41. When the lever 44 is pushed axially inwardly or swung in any direction, which it is capable of doing, the plunger 39 will be moved axially inwardly. Such movement, effected by the tilting of the lever, (Figure 5) will shift the head at such angle relatively to the wall 48 of the housing 46 as to force the head 43 and plunger 39 inwardly, due to limited angular contact between the heads. It is a distinct advantage to complementally curve the bearing faces of the heads, first, for the reason of accurate alignment of the lever and plunger when no pressure is exerted on the actuator or lever 44, and, second, because the relative angular bearing engagement between the heads (see Figure 5) prevents the edge of one head cutting into and wearing or gouging the face of the other head. The operative tilting engagement will at all time remain perfect, thus reducing power necessary to operate the valve.

Operating connections between the plunger 39 and auxiliary valve to cause the latter to open are made as follows:

52 designates a bell-crank lever which has a laterally widened lower arm 51. It is pivoted at its angle to the casing by a pin 53. The upper arm 54 of said lever (referring to Figures 1 to 5, inclusive) extends alongside the casing wall in the plane of the plunger 39 so that when the plunger is shifted inwardly it engages said upper arm 54 and swings it away from the axis of the casing and swings the lower arm of said lever upwardly (Figure 3). The lower arm of said lever is in line with one of the legs $36^2$ of the auxiliary valve stem, but normally does not support the valve, so that when the bell-crank lever is swung on its pivot the upward swinging movement of the lower arm of the bell-crank lever lifts the auxiliary valve. Two of said legs $36^2$ are provided, which straddle the plunger 29, so that one of the legs will be assured of cooperative relation to the lower lever arm, without necessitating care in replacing the unit with the legs $36^2$ thereon, within the casing. However, a single leg with a double lower arm for the bell-crank would, though not so satisfactorily with respect to the voluminal area for liquid flow, answer the same purpose.

In the construction shown in all the figures, the starting or auxiliary valve is fully opened at the extreme or inward stroke of the plunger 39 so as to allow the required release of pressure on the upper side of the piston 25. In the construction shown in Figures 1 to 5, inclusive, arrangements are made so that the lifting element 52 can be automatically thrown out of action to allow the auxiliary valve to close even though the plunger 39 is not restored, so that liquid will not continue to flow through the valve in the event the actuator handle or lever 44 may be accidentally or purposely held off center or held pushed in.

For this latter purpose, there is provided a tripping device for the lifting element 52 which will release the latter from the plunger when a full axial inward displacement of the latter has taken place, thereby allowing the lifting element to resume its normal position, either by its own weight about its pivot 53 or by the impact of water flow against the lower arm thereof. Means for thus tripping the lifting element out of the influence of the plunger 39 is herein shown as made as follows:

55 designates a flange within the outlet chamber that is provided with an oblique cam edge or face 56 that is adapted for engagement by a lug 57 that extends laterally from the upper arm 54 of the bell cranklever or lifting element. Engagement of this lug with the cam 56 has the effect, when the upper arm of the lifting element is pushed outwardly by inward axial movement of the plunger 39 to cause the said lifting element, or at least that portion of the lifting element that is embraced in or includes the upper arm 54, to be shifted laterally away from the plane of the axis of the plunger 39. Such lateral shifting of the lifting element is herein shown as effected by an arrangement which permits the entire lifting element so to shift.

For this purpose the lifting element can slide endwise on its pivot pin 53, and a spiral expansion spring 58 is interposed between one side of said upwardly extending arm 54 and a shoulder 59 within the casing. This spring tends normally to hold the lug 57 of the lifting element pushed against the cam face 56, while allowing the lifting element, or, at least, the upper arm 54 thereof, to be moved in the other direction when the lug 57 of the lifting element wipes against the cam face of said flange in the backward swing of said cam, and thereby shifts the upper end of the lever arm 54 out of the path of the plunger so as to permit the lifting element to drop to the position shown in Figure 4, and thus allow the auxiliary valve 35 to be seated by its spring 37.

The foregoing arrangement constitutes a very simple and efficient means for positively lifting the auxiliary valve and for subsequently releasing said valve from the influence of the actuator lever or handle 44 so that in the event the latter handle or lever becomes permanently displaced the starting or auxiliary valve can seat so as to thereby permit the main valve to be seated through the influence of inlet pressure acting on differentially dimensioned faces of the valve parts.

Figure 6:
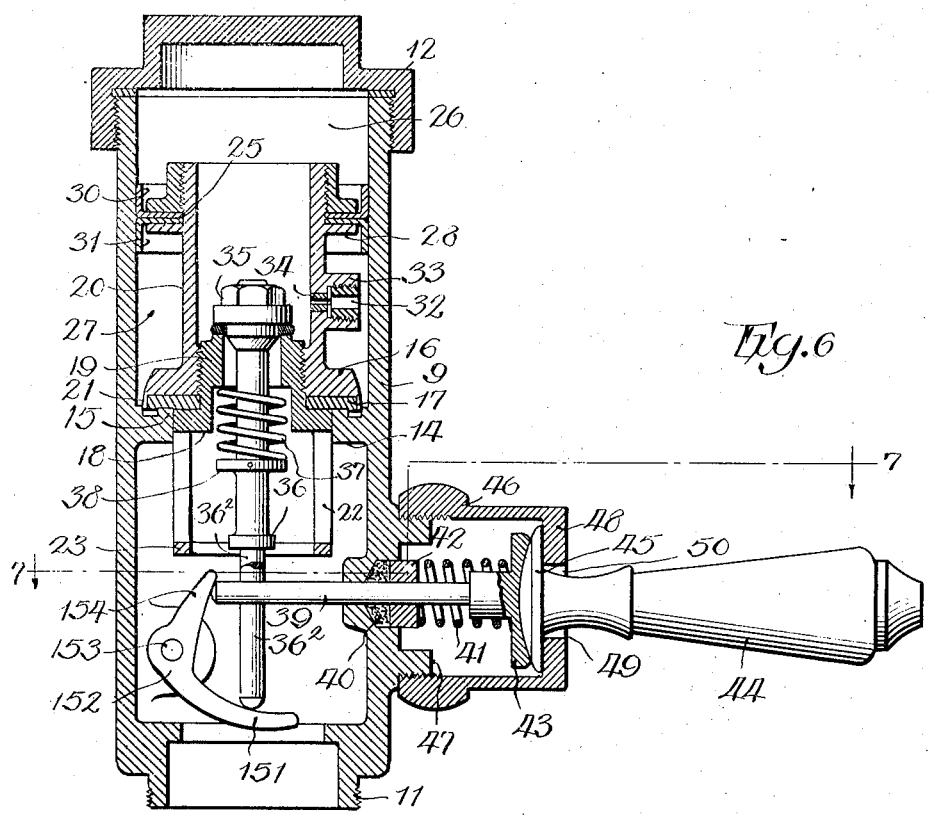
Figure 6 is a view similar to Figure 1, showing a modification.
Figure 7:
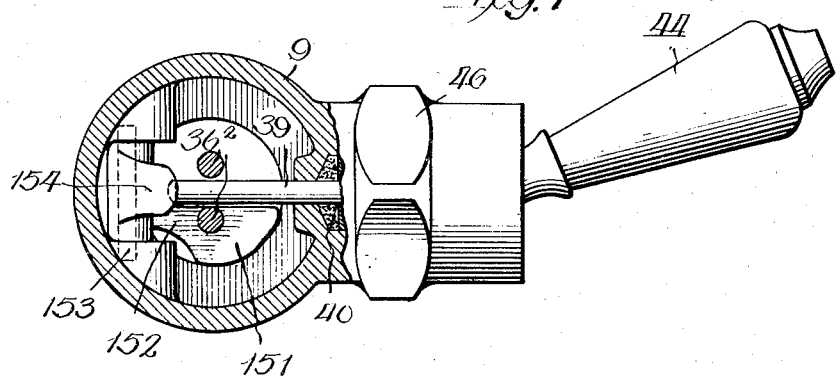
Figure 7 is a section on the line 7—7 of Figure 6, showing the actuator lever in a changed position.

In the construction shown in Figures 6 and 7, the lifting element or bell-crank lever 152, corresponding to the element 52 in the parts hereinbefore described, is mounted on its pivot pin 153 between shoulders 159, 159 so as not to be capable of shifting sidewise when the upper arm 154 thereof swings backwardly. Therefore, the auxiliary valve will be held open until operating pressure on the actuator or handle 44 is released, and the plunger restored to normal position by the spring when said lifting element will drop by gravity, assisted, if necessary, by the impact of the liquid flow through the valve outlet. The lower arm 151 of the lifting element can, in this latter modification, be made somewhat narrower, if desired.

In both the constructions shown, the spring 32 serves as a means to seat the auxiliary or starting valve, and it is clear from an examination of Figure 3 that should the main valve tend to stick on its seat the strength of the nearly closed spring or direct thrust of the closed spring will serve to assist differential pressure acting on the piston 25 to unseat the main valve. For this purpose, the cross member or arm 36' is made of a dimension to enter the opening of the hollow valve, and the throw of the actuator and lifting devices will be ample to produce the effect desired in this respect.

I claim as my invention:

1. A flush valve comprising a casing having a liquid thoroughfare, a main valve to control said thoroughfare, an auxiliary valve to control said main valve and provided with a depending stem, an axially movable, spring-returned actuator, a lifting element pivotally connected to a fixed support and operatively connected between said stem and said actuator to control said auxiliary valve by endwise movement of said actuator, and means to disconnect said operative connection to allow the auxiliary valve to seat independently of the position of the actuator.

2. A flush valve comprising a casing having a liquid thoroughfare, a main valve to control the same, an auxiliary valve to control the main valve, an actuator for the auxiliary valve, a swinging and laterally moving lifting element pivoted to the casing and operatively disposed between the auxiliary valve and the actuator, and means cooperating to cause lateral movement of said element to trip said connection.

3. A flush valve comprising a casing having a liquid thoroughfare, a main valve to control the same, an auxiliary valve to control the main valve, an actuator for the auxiliary valve, a lifting element pivoted to the casing operatively connected between the auxiliary valve and the actuator, and cam means fixed on the casing to trip the operative connection at the limit of operation of the actuator.

4. A flush valve comprising a casing having a liquid thoroughfare, a main valve to control the same, an auxiliary valve to control the main valve, an actuator for the auxiliary valve, a swinging lifting element pivoted to the casing and having one arm disposed to lift said auxiliary valve and having another arm actuated by the actuator, and means operative at the limit of movement of the actuator to move the latter arm out of operative relation to the actuator.

5. A flush valve device comprising a casing having a liquid thoroughfare, a main valve to control the same, an auxiliary valve to control the main valve, an actuator for the auxiliary valve, and a swinging and laterally shiftable lifting element operatively disposed between the actuator and said auxiliary valve to operate the latter and adapted by its shiftable function to break connection between said element and said auxiliary valve.

6. A flush valve device comprising a casing having a liquid thoroughfare, a main valve to control the same, an auxiliary valve to control the main valve, an axially movable plunger, a swinging lifting element having one arm in position to lift said valve, and a second arm in line with said plunger and means operative at the end of the movement of said plunger for shifting the latter arm out of the plane of the plunger.

7. A flush valve device comprising a casing having a liquid thoroughfare, a main valve to control the same, an auxiliary valve to control the main valve, an axially movable plunger, a bell crank lever having one arm in the path of the liquid flow through the valve device and adapted to lift the auxiliary valve and provided with means whereby it may be actuated by the plunger and whereby it is shiftable out of operative relation to the plunger.

8. A flush valve device comprising a casing having a liquid thoroughfare, a main valve to control the same, an auxiliary valve to control the main valve, an axially movable plunger, a bell crank lever having one arm in the path of the liquid flow through the valve device and adapted to lift the auxiliary valve and provided with means whereby it may be actuated by the plunger and whereby it is shiftable out of operative relation to the plunger, embracing means to laterally shift said lever.

9. A flush valve device comprising a casing having a liquid thoroughfare, a main valve to control the same, an auxiliary valve to control the main valve, an axially movable plunger, a bell crank lever having one arm in the path of the liquid flow through the valve device and adapted to lift the auxiliary valve and provided with means whereby it may be actuated by the plunger, and cam means operative during axial movement of the plunger to shift said lever out of operative relation to said plunger.

10. A flush valve device comprising a casing having a liquid thoroughfare, a main valve to control the same, an auxiliary valve to control the main valve, an axially movable plunger, a bell crank lever having one arm in the path of the liquid flow through the valve device and adapted to lift the auxiliary valve and provided with means whereby it may be actuated by the plunger and whereby it is shiftable out of operative relation to the plunger, said lever being normally spring held in operative relation to said plunger.

11. In a valve device, the combination with a main valve, an auxiliary valve mounted on and controlling said main valve and provided with a depending projection, an actuating plunger, a lifting device operatively connected between said plunger and said projection, and means cooperative with the axial movement of said plunger to shift said lifting device out of the plane of said plunger.

12. In a valve device, the combination with a main valve, an auxiliary valve mounted on and controlling said main valve and provided with a depending projection, an actuating plunger, a bell crank lever with one arm normally in the plane of the plunger and its other arm in position to lift said auxiliary valve, and means operative at the extreme throw of said plunger to trip said first arm of said lever out of the plane of said plunger.

13. In a valve device, the combination with a main valve, an auxiliary valve mounted on and controlling said main valve and provided with a depending projection, an actuating plunger, a bell crank lever with one arm normally in the plane of the plunger and its other arm in position to lift said auxiliary valve, means operative at the extreme throw of said plunger to trip said first arm of said lever out of the plane of said plunger, and a universally swingable actuator lever having a head adapted to engage a head on said plunger and adapted for rim edge engagement with the plunger head when said actuator lever is swung.

14. In a valve device, the combination with a main valve, an auxiliary valve mounted on and controlling said main valve and provided with a depending projection, an actuating plunger, a bell crank lever with one arm normally in the plane of the plunger and its other arm in position to lift said auxiliary valve, means operative at the extreme throw of said plunger to trip said first arm of said lever out of the plane of said plunger, and a universally swingable actuator lever having a head adapted to engage a head on said plunger and adapted for rim edge engagement with the plunger head when said actuator lever is swung, said lever and plunger heads having co-acting convex and concave faces.

15. A flush valve comprising a casing having a liquid thoroughfare, a main valve to control the same, an auxiliary valve to control the main valve, an actuator for the auxiliary valve, a lifting element operatively connected between the auxiliary valve and the actuator, comprising an upwardly and downwardly swingable arm, with means to actuate it, and twin sidewise disposed elements to straddle the actuating means and adapted for interchangeable contact with said arm.

16. A flush valve device comprising a casing having a liquid thoroughfare, a main valve to control the same, an auxiliary valve to control the main valve, an axially movable plunger, and a swinging lifting member actuated by said plunger, said auxiliary valve having depending twin elements adapted for interchangeable cooperative engagement with said lifting member and to straddle said plunger.

17. The combination with a valve to control a thoroughfare and its stem having twin terminal elements, of an operating member which extends between said terminal elements in a manner to prevent turning of said valve and its stem, and a lifting element operatively connected between said operating member and said valve stem, said terminal elements being adapted for interchangeable contact with said lifting element.

18. The combination with a valve to control a thoroughfare and its stem having a laterally offset terminal element, of an operating member which lies in the plane of the axis of the valve stem and at one side of said laterally offset part, and a lifting element operatively connected between said operating member and said offset terminal element of said stem.

In witness whereof I claim the foregoing as my invention, I hereunto append my signature this 29th day of March, 1920.

EDWARD L. KELLAN.